(12) United States Patent
Pettyjohn et al.

(10) Patent No.: US 9,202,247 B2
(45) Date of Patent: *Dec. 1, 2015

(54) SYSTEM AND METHOD UTILIZING VOICE SEARCH TO LOCATE A PRODUCT IN STORES FROM A PHONE

(71) Applicant: aisle411, Inc., St. Louis, MO (US)

(72) Inventors: Nathan Pettyjohn, St. Louis, MO (US); Matthew Kulig, Millstadt, IL (US)

(73) Assignee: aisle411, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/629,259

(22) Filed: Feb. 23, 2015

(65) Prior Publication Data

US 2015/0170257 A1 Jun. 18, 2015

Related U.S. Application Data

(63) Continuation of application No. 13/461,738, filed on May 1, 2012, which is a continuation-in-part of application No. 12/134,187, filed on Jun. 5, 2008, now abandoned.

(51) Int. Cl.
| | |
|---|---|
| H04M 1/64 | (2006.01) |
| G06Q 30/06 | (2012.01) |
| H04M 3/493 | (2006.01) |
| G10L 15/22 | (2006.01) |
| G10L 15/26 | (2006.01) |
| H04M 3/42 | (2006.01) |
| G10L 15/18 | (2013.01) |

(52) U.S. Cl.
CPC ........ *G06Q 30/0639* (2013.01); *G06Q 30/0603* (2013.01); *G10L 15/22* (2013.01); *G10L 15/26* (2013.01); *H04M 3/4936* (2013.01); *G10L 15/1822* (2013.01); *G10L 2015/223* (2013.01); *H04M 3/42348* (2013.01); *H04M 2201/40* (2013.01); *H04M 2203/1058* (2013.01); *H04M 2203/355* (2013.01); *H04M 2250/74* (2013.01)

(58) Field of Classification Search
CPC .................................................. H04M 3/42348
USPC ........ 379/88.01–88.04, 88.14, 88.17, 201.06, 379/201.1; 455/417; 705/40; 707/722
See application file for complete search history.

(56) References Cited

U.S. PATENT DOCUMENTS

| | | | |
|---|---|---|---|
| 6,813,341 B1 * | 11/2004 | Mahoney | ................... 379/88.01 |
| 7,864,929 B2 * | 1/2011 | Carro | .................. H04M 3/4938 379/88.04 |
| 8,762,131 B1 | 6/2014 | Diaconescu | |
| 2006/0100896 A1 | 5/2006 | Lahey | |
| 2009/0304161 A1 | 12/2009 | Pettyjohn | |
| 2012/0232897 A1 | 9/2012 | Pettyjohn | |

* cited by examiner

*Primary Examiner* — Md S Elahee
(74) *Attorney, Agent, or Firm* — Lewis Rice LLC

(57) ABSTRACT

A system and method for providing automatic voice recognition and voice response product location information in a store while using a personal mobile phone or any phone connected to a telecommunications or data communications network such as and including the Internet and an automatic speech recognition system. The system 403 & 404 asks a user and/or customer 300 a series of automated questions to help the user and/or customer 300 locate products in stores. In the embodiment of the invention, the user and/or customer 300 only needs to dial the toll free or dial in number 302 from any phone to use the system in order to receive the requested product location information or other available information by the automated response system. This invention creates the product location assistance (PLA) system to be used in locating products in stores, creating new efficiencies in customer service for retailers, businesses and organizations.

14 Claims, 5 Drawing Sheets

SYSTEM AND METHOD UTILIZING VOICE SEARCH TO LOCATE A PRODUCT IN STORES FROM A PHONE

CROSS REFERENCE TO RELATED APPLICATIONS

This application is a Continuation of U.S. Utility patent application Ser. No. 13/461,738 filed May 1, 2012, which issued on Sep. 29, 2015, as U.S. Utility Pat. No. 9,147,212, and which is, in turn, a Continuation-in-Part of U.S. patent application Ser. No. 12/134,187, filed on Jun. 5, 2008, now abandoned. The entire disclosures of both the above applications are incorporated herein by reference.

BACKGROUND

1. Field of the Invention

This invention relates to the field of product location assistance (PLA), and in particular to locating products in stores, businesses and/or organizations using automatic speech recognition.

2. Description of the Related Art

Traditional directory assistance services allow callers to get phone numbers and address information from their phones. Known prior art allows customers or users to access kiosks, internal phone systems, mobile text messaging, mobile internet programs and internet connected computers to access a variety of information programs using voice or text search methods to locate product inventory or product pricing from the Internet. There currently exist many phone dial-in systems that use automatic speech recognitions for customer service functions such as directory assistance systems. However, there is currently not a system or method that allows users to access the product location in a store and additional information from an automated voice based automatic speech recognition system using the user's and/or customer's personal phone devices while in the store or anywhere the user and/or customer wants to retrieve the information.

The following prior art patents represent various inventions relating to machines, systems and methods involving product locators, speech recognition for voice-based operation, and thus illustrate known voice recognition applications for use in asking for and receiving information using automatic speech recognition systems:

U.S. Pat. No. 5,111,501 describes a telephone terminal device equipped with a transmitter microphone, a receiver, a speech recognition unit that receives and recognizes speech signals from the transmitter microphone.

U.S. Pat. No. 5,222,121 describes a voice recognition dialing unit of a telephone mounted on a vehicle or similar mobile body and which allows a call to be originated with ease.

U.S. Pat. No. 5,231,670 describes a system and method for generating text from a voice input that divides the processing of each speech event into a dictation event and a text event.

U.S. Pat. No. 5,671,328 describes a method and data processing system which are disclosed for automatically creating voice processing template entries.

U.S. Pat. No. 5,850,627 describes a word recognition system which can respond to the input of a character string from a user by limiting the words it will recognize to words having a related, but not necessarily the same, string.

U.S. Pat. No. 6,092,045 describes matching unknown speech with known models to perform speech recognition.

U.S. Pat. No. 6,157,705 provides a method for controlling a server using interactive voice response system thereby requesting information stored on the server and receiving the information visual from a remote server.

U.S. Pat. No. 6,533,173 provides a product locator that is a computer mounted to a shopping cart that receives data from a second computer. It allows a customer to receive location information about products using the computer.

U.S. Pat. No. 6,807,574 creates a method and apparatus for providing personalized information content over telephones and establishes a user profile based upon unique identifying information.

U.S. Pat. No. 6,813,341 provides a voice system to locate items using a specific software module and in store internal connector locator system. The system's information can only be accessed using an internal system of portable devices, specifically short distance wireless devices. This patent does not offer a system or method for users and/or customers to use any phone and a dial in number to locate the product information from anywhere.

U.S. Pat. No. 7,016,845 provides a method of providing speech recognition resolution on an application server in a communication network includes receiving an utterance from an end-user. The method further includes performing item-matching via a search algorithm, returning items matching the utterance to the application server, and returning relevant utterance matches to the application user.

U.S. Pat. No. 7,027,987 provides a system for search results from a voice search query. The system receives a voice search query from a user, derives one or more recognition hypotheses, each being associated with a weight, from the voice search query, and constructs a weighted Boolean query using the recognition hypotheses. The system then provides the weighted Boolean query to a search system and provides the results of the search system to a user.

U.S. Pat. No. 7,082,392 relates to the management, in an interactive voice response system, of a plurality of speech technology modules. In particular it relates to an apparatus and a method for dynamically determining which of a plurality of speech technology modules to use during voice interaction between the system and a user.

U.S. Pat. No. 7,194,069 creates a system for providing access to data via a voice interface.

U.S. Pat. No. 7,343,290 concerns a method of switching from one original dialog system, to a target dialog system, whereby the language of the speech recognition and/or speech output unit, of the target dialog system can be set.

U.S. Pat. No. 7,366,668 creates a system to provide search results from a voice search query. The system receives a voice search query from a user, derives one or more recognition hypotheses, each being associated with a weight, from the voice search query, and constructs a weighted Boolean query using the recognition hypotheses. The system then provides the weighted Boolean query to a search system and provides the results of the search system to a user.

This prior art, known by the inventors, creates automatic speech recognition systems and product locators using in store communication systems, text to speech and speech to text conversions for voice and data for the purposes of locating information desired by the user. It also creates query organization for ranked responses to requests. It does not allow the user and/or customer to request specific product location information from their personal phone. It does not specifically create the systems and methods claimed in this patent.

In addition, the following patent applications propose system and methods for a voice system to process and provide information to users and or customers.

U.S. Patent Applications 20040228456 creates an item location system which relies upon voice activation and responsiveness to identify location(s) of item(s) sought by a user.

U.S. Patent Application 20050090931 creates a method for using bar code readers to establish product location directories for use in product locator systems.

U.S. Patent Application 20070038445 creates a device to improve speech recognition accuracy by utilizing an external knowledge source.

U.S. Patent Application 20070033025 creates a method of improving speech recognition includes receiving a plurality of recognized sentences from an automatic speech recognition engine.

U.S. Patent Application 20070165795 creates a system and method for providing SMS, MMS and/or WAP information to a mobile unit user in response to a request made by the user using an interactive voice response (IVR) system. This Patent Application does not provide an interactive product location assistance (PLA) system.

U.S. Patent Application 20070263796 creates a method and system to provide data to an Interactive Voice Response (IVR) System.

The inventors are also aware of recent improvements in voice recognition technologies and testing utilized recently for one of the newer free directory assistance systems. The information is covered in the white paper: "Deploying GOOG-411: Early Lessons in Data, Measurement, and Testing" by Michiel Bacchiani, Francoise Beaufays, Johan Schalkwyk, Mike Schuster, Brian Strope at Google, Inc. The system uses mapping technologies to provided directory assistance information to user of the service.

Notwithstanding the entire prior art listed, the present invention is neither taught nor rendered obvious by these patents and patent pending documents or white papers.

SUMMARY

The following is a summary of the invention which should provide to the reader a basic understanding of some aspects of the invention. This summary is not intended to identify critical components of the invention, nor in any way to delineate the scope of the invention. The sole purpose of this summary is to present in simplified language some aspects of the invention as a prelude to the more detailed description presented below.

Described herein, among other things, is a system and method for requesting and receiving product locations within stores, businesses and/or organizations using a personal mobile phone or any phone connected to a telecommunications and/or data communication network such as and including the Internet, a branded toll free or any dial in number and automatic speech response system.

In an embodiment, such system and method is for requesting product information by product description and/or by product brand name or by both brand name and description.

In another embodiment, such system and method is for accessing and requesting additional product information such as inventory numbers, pricing, product availability, product specifications and other relevant user requested data managed by the system.

In another embodiment, such system and method uses a branded toll free or any dial in number for access from anywhere.

In another embodiment, such system and method allows a user to request the information using computer generated voice response prompts.

In another embodiment, such system and method uses voice recognition technology to process user product requests.

In another embodiment, such system and method offers additional information provided by the store including product suggestions related to the product.

In another embodiment, such system and method is for accessing and requesting voice automated directions to a product location from a stationary point from within a business or organization.

Also described herein, among other things, is a system and method for converting inventory data and product location information into automated voice prompts accessible by any phone connected to a telecommunications network.

In an embodiment of such system and method, data can be converted into multiple languages.

In another embodiment of such system and method, data offers additional information provided by the store including product suggestions related to the product.

In another embodiment, such system and method is for accessing and requesting voice automated directions to a product location from a stationary point from within a business or organization.

Also described herein, among other things, is a system and method that, upon the first call into the system, matches the language choice of the user and/or customer to the number from which the user and/or customer is calling and always uses that language choice when called from that number unless specifically requested otherwise within the system by the user and/or customer. This eliminates the need to prompt the user for language choice after the first time using the system.

DESCRIPTION OF THE PREFERRED EMBODIMENT(S)

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and apparatus. As various changes could be made in the above constructions without departing from the scope of the disclosures, it is intended that all matter contained in the above description or shown in the accompanying drawings shall be interpreted as illustrative and not in a limiting sense.

This invention utilizes new unique systems and methods for gathering, formatting, accessing, and interacting with product data, moving the assistance system concept to the product level in the stores, creating a product location assistance (PLA) system. For those skilled in the art, the novelty of this invention includes a user's and/or customer's ability to use a personal phone device to access product information using voice request and voice response systems to retrieve the product location and additional information. This method allows the user and/or customer to ask for and receive information via the automatic speech recognition system to locate the product while in the store or from any type of phone.

The present invention creates a system and method for users and/or customers to locate products in stores and additional requested information using a user's and/or customer's personal mobile phone or a phone system connected to a telecommunications network such as and including the Internet. Voice request and voice response systems, called automatic speech recognition, provide interactive voice response tools that use speech to text and text to speech methods. The automatic speech recognition system can access store inventory and/or planogram information through a converted inventory data standard formatted for integration with a text to speech and speech to text program loaded on a server creating a real-time voice prompt giving the user and/or customer a product location. The user and/or customer can search by product description and/or product brand name. The invention creates a way for users and/or customers to access and receive product location and other provided information while shopping in the store using their mobile phone.

Figure 1:
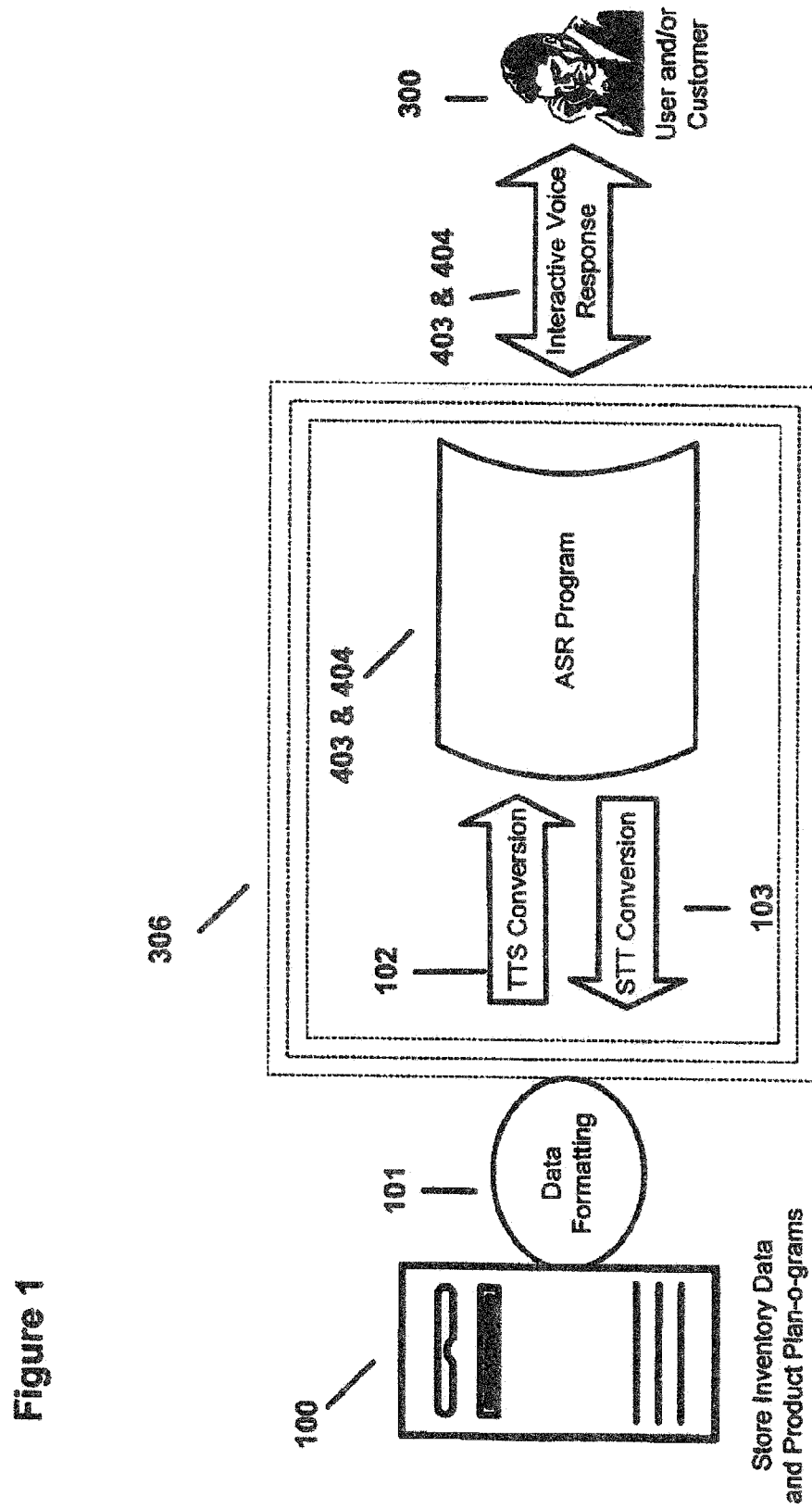
FIG. 1 shows the data formatting and the text to speech and speech to text conversion system which generates the voice responses of the automatic voice response system to provide the user the automated voice responses. The data is formatted and updated by retailer inventory systems by batching their information with the systems information.

FIG. 1 shows an embodiment of a step in the system and method. The store's inventory data and planogram information 100 is converted 101 to a data format that allows text to speech 102 tools to create automated voice responses. Text to speech 102 and speech to text 103 tools are used to find the correct data and create the voice prompts giving product location information, which are stored on the automatic speech recognition system 403 and 404 located on a computer server 306 to provide the requested product location and additional information to the user and/or customer when they call the system. The system can be updated, via hatching, when the retailer updates its internal systems to create up-to-date inventory information.

Figure 2:
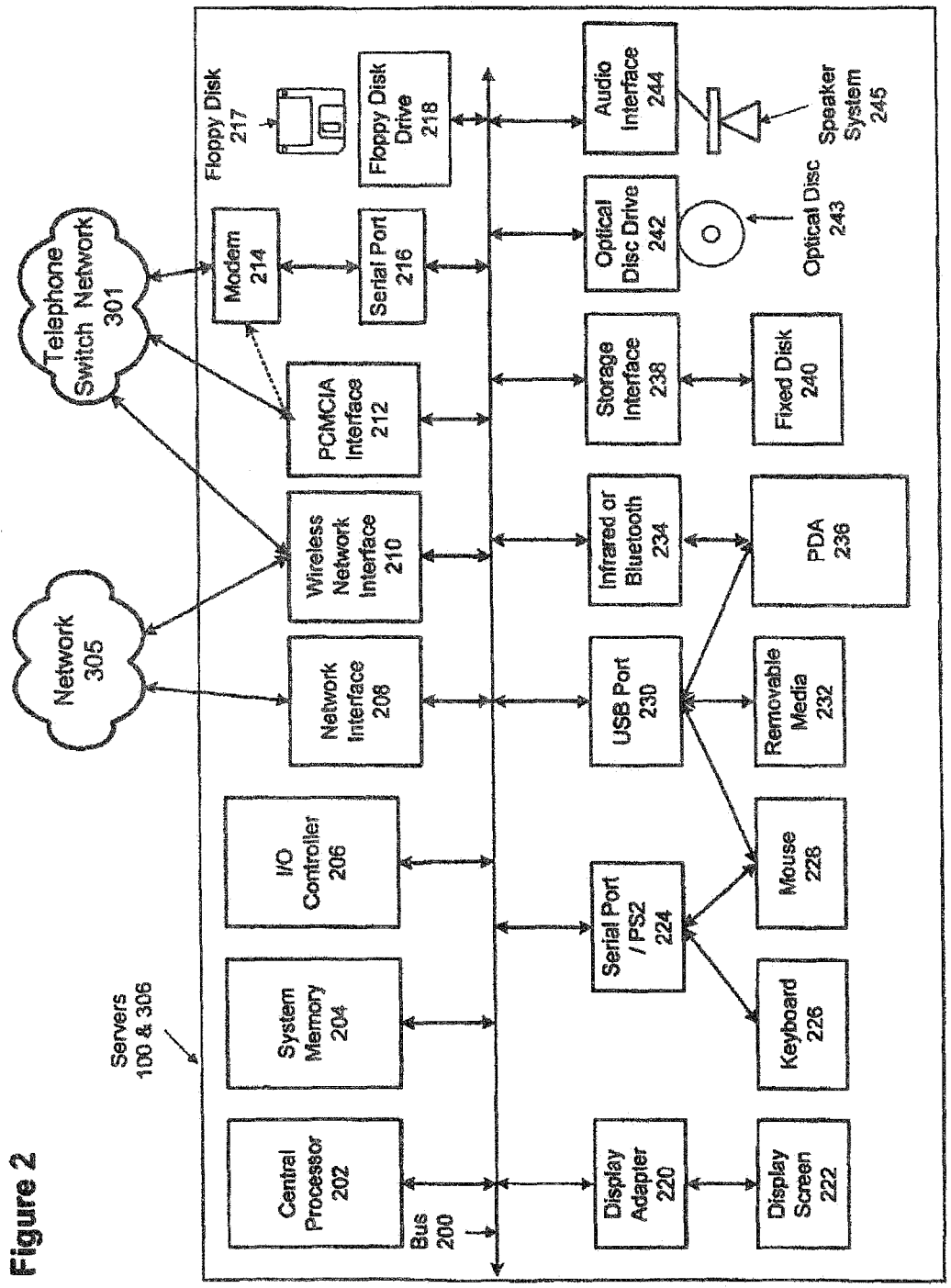
FIG. 2 shows the computer server or workstation and all its components that allow an automatic speech recognition system, including an interactive voice response system, and speech to text and text to speech to run and interface with the user and/or customer.

FIG. 2 depicts an embodiment of a computer server or workstation 200-245 that allows it to load and run the software required to accomplish the tasks needed to perform the system and method. It also shows the network 305 and telephone network connections 305 and 301 that allow it to interface with a routing network.

Figure 3:
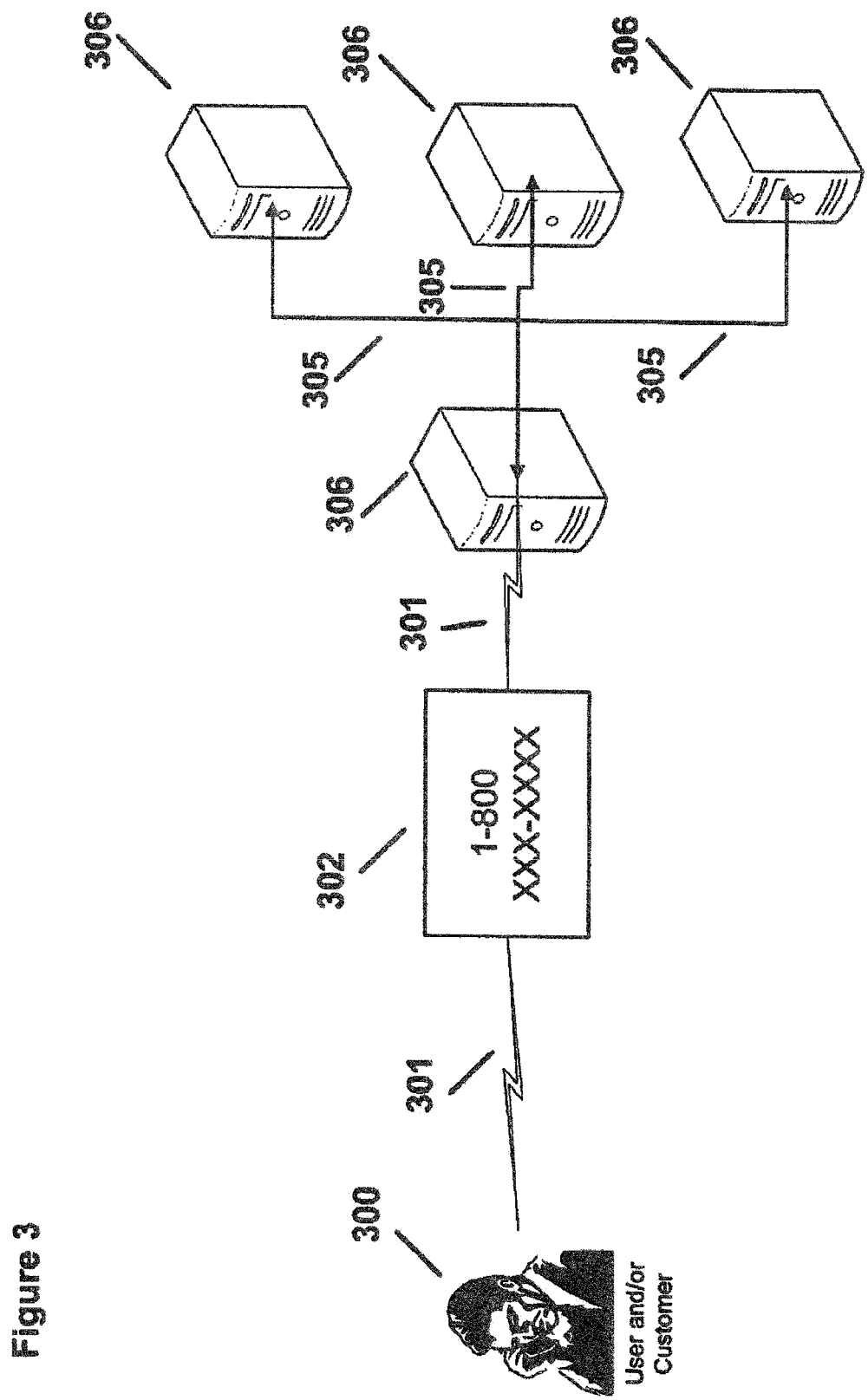
FIG. 3 shows the method for dialing into automatic speech recognition systems using a toll free or dial in number to request product location information in a store. The product location information is stored in servers using automatic speech recognition systems, including interactive voice response tools that use speech to text and text to speech methods to create automated voice responses to users inquires.

FIG. 3 depicts an embodiment of a process of using the system and the flow of information in the method. In the depicted embodiment, a user and/or customer 300 using a phone dials a toll free or dial in number 302 which connects them to a bank of servers 306 using the automatic speech response system 403 & 404. The automatic speech response system 403 & 404, via a series of automated questions and answers, provides the user and/or customer 300 with requested information as to where the product is located in the store. The user and/or customer 300 can request product information by product description and/or product brand name. This system via the stores request can provide additional information such as current pricing, inventory counts, next shipment date, product specifications and other inventory information 100 provided by the store to the text to speech 102 tools to create automated real time prompts from the stored data. The servers 306 can be programmed to understand multiple languages requested by the store for their customers. The user and/or customer 300 can continue requesting additional product location information until the call is terminated.

Figure 4:
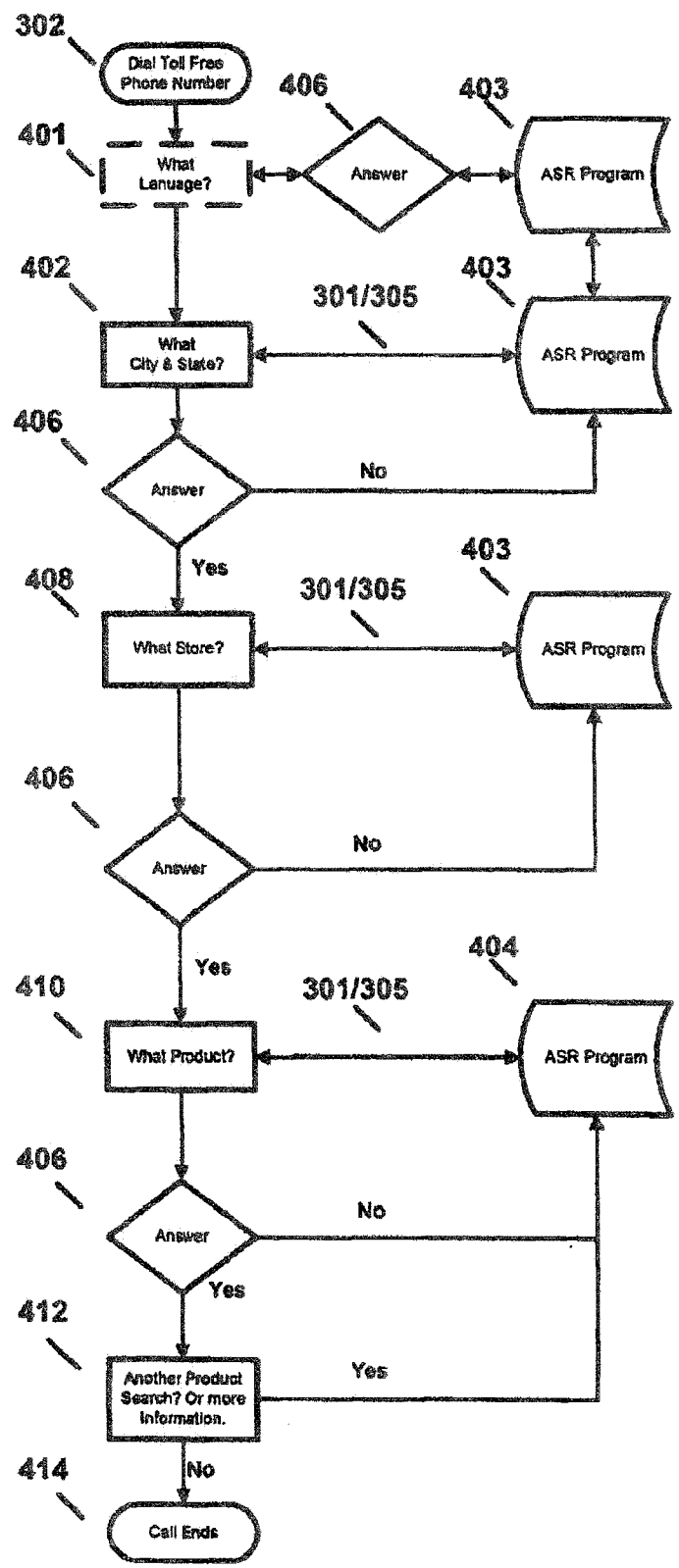
FIG. 4 shows the process the user and/or customer goes through to ask for and receive product location information and other requested information in the store provided by the system. A series of questions is asked by the automatic speech recognition system to route the user and/or customer to the correct store location to find the product in that particular store location.

FIG. 4 depicts a flow diagram of an embodiment of the system and method for locating a product. The system is automated and connected to a bank of servers that are running the automatic speech recognition systems. It asks a series of questions, such as language choice 401, city and state 402, store name 408 and product 410. Based upon the user and/or customer responses 406, it provides the appropriate data and using a text to speech tool creates a voice response for the requested product location.

The language question is only requested by the system the first time a user and/or customer uses it. The system matches the language choice of the user and/or customer to the number from which the user and/or customer is calling and always uses that language choice when called from that number unless specifically requested otherwise within the system by the user and/or customer. This eliminates the need to prompt the user for language choice after the first time using the system.

The following illustrative example depicts an interaction using the system. A user and/or customer 300 calls a branded toll free number or dial-in number 302 and hears from the automatic speech response system, "What language?" 401 The user and/or customer 300 responds: "English." The system 403 chooses the server bank for English language interaction. This language choice will subsequently be used when the caller calls the system 403 and the appropriate server bank 306 is matched to the phone number. The system prompts, "What city and state?" 402 The user and/or customer 300 responds: "Chicago, Ill." The system 403 matches the answer (yes) and chooses the appropriate server bank 306 for Chicago, Ill. If the system 403 cannot match the answer (no) it prompts the user with the same question 402. The system prompts, "What Store?" 408 The user and/or customer 300 responds with a store name. The system 403 matches the answer (yes) or provides more information to select the particular store location (no) or does not match (no) and asks the question again 408. The system prompts, "What Product?" 410 The user and/or customer 300 responds with a product identifier, such as "duct tape" or "3M" or "3M duct tape." The system 404 matches the answer (yes) and provides the correct location and other information provided by the store or provides information that the product is not in the store. If the system 404 does not match the answer (no), it will ask the question again 410.

Once the user and/or customer 300 receives the information requested, the system 404 will ask if the user and/or customer 300 needs to locate another product or requires more information 412. If yes, it will return to the user and/or customer 300 to question 410. If no, the call will terminate 414.

If the user and/or customer 300 hang up the phone anytime during the call, the call will terminate 414.

Figure 5:
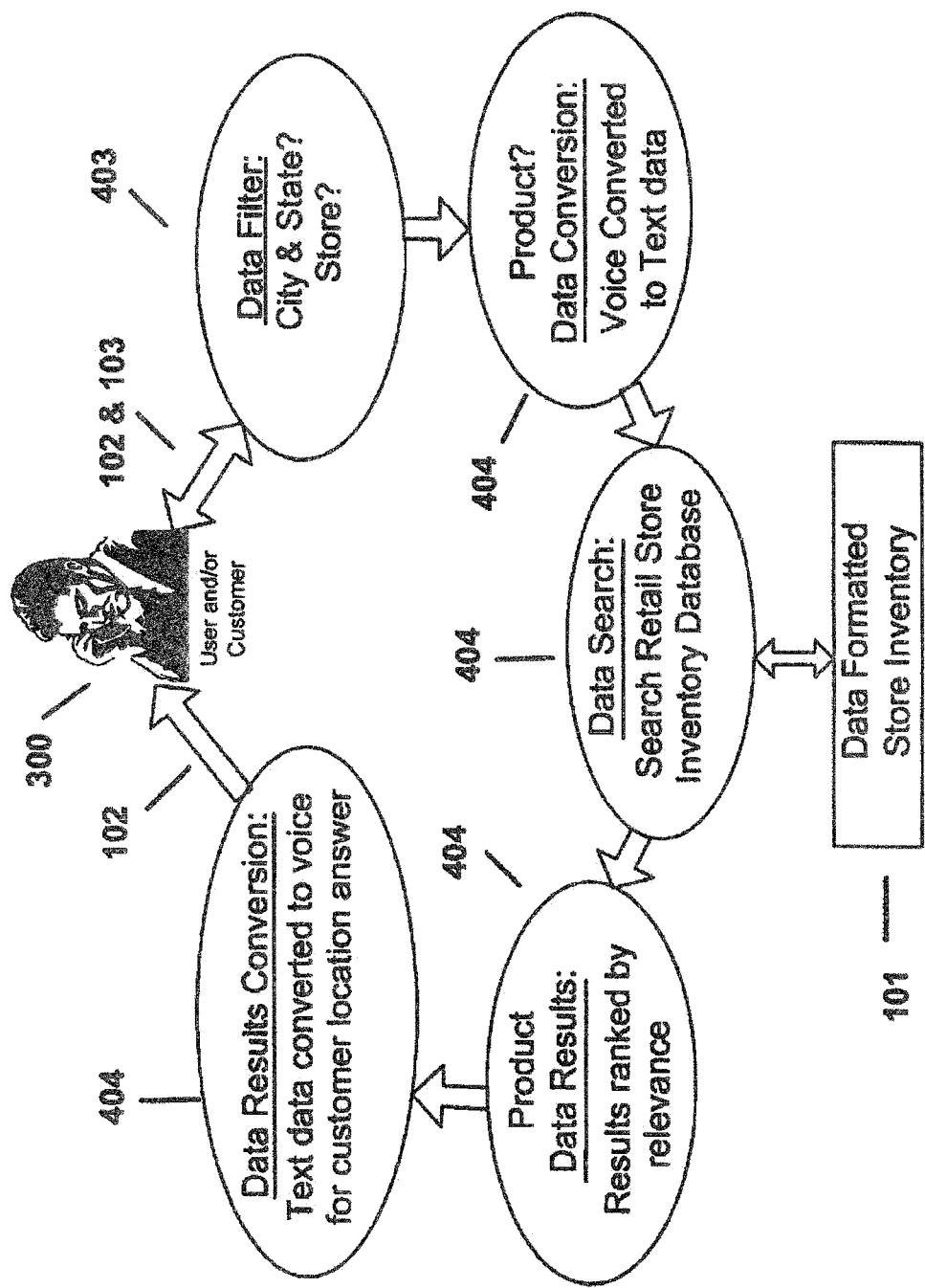
FIG. 5 shows the operation of system method from the user and/or customer using the automatic speech recognition tools in the system to search, locate and have the system create a real time voice prompt for the user and/or customer in answer to their product location request and other requested information provided by the store.

FIG. 5 depicts an embodiment of the operation of the system from the user and/or customer 300 through the automatic speech response system 403 and 404. The system through a series of questions on 403 using speech to text 103 and text to speech 102 systems routes the user and/or customer to the correct location and correct store inventory data 404 that had been created from 101. Once the automatic speech response system 404 matches the correct item it creates a voice response using a text to speech tool 102 for the user and/or customer based upon the user and/or customers requested match.

This is the embodiment of the product location assistance (PLA) system, which can be added to existing and/or new directory assistance systems as an additional level of information for users and/or customers to access.

Accordingly, the reader can see that this system and method provides a dial-in interactive voice response system 403 & 404 specifically designed to locate products and product information in stores from any phone anywhere. The user and/or customer 300 product requests can be by product description and/or product brand name or both. No software or hardware other than the user's and/or customer's 300 phone is required to use the system. This allows the user and/or customer 300 to help locate products in stores themselves, creating new efficiencies in customer services.

While this invention has been disclosed in connection with certain preferred embodiments, this should not be taken as a limitation to all of the provided details. Modifications and variations of the described embodiments may be made without departing from the spirit and scope of this invention, and other embodiments should be understood to be encompassed in the present disclosure as would be understood by those of ordinary skill in the art.

The invention claimed is:

1. A method for providing product location information to a user while the user is shopping using the user's mobile phone comprising:
    providing a computer server interfacing with a network and comprising a central processor and a system memory having retailer inventory data for a plurality of products, said retailer inventory data formatted as a programmatically searchable plain text taxonomy including synonyms, slang, and phonetic data for each product;
    providing a personal mobile phone connected to said network;
    placing a voice call to said server using said personal mobile phone;
    on said placed voice call, a user of said personal mobile phone speaking a product identifier into said personal mobile phone;
    using an automatic speech recognition system, converting said spoken product identifier from speech to text;
    said server receiving said product identifier converted to text;
    using software stored in said system memory and executed by said central processor, said server finding a location in a store of a desired product of said plurality of products identified by said product identifier at least in part by searching said programmatically searchable taxonomy for said desired product matching said product identifier converted to text;
    using an automatic speech response system, converting said found location of said identified product to a spoken response;
    speaking said converted spoken response to said user through said personal mobile phone.

2. The method of claim 1, wherein said network is a data communication network.

3. The method of claim 2, wherein said data communication network is the Internet.

4. The method of claim 1, wherein said product identifier is a product brand name.

5. The method of claim 1, wherein said product identifier is a product description.

6. The method of claim 1, wherein said spoken response further comprises additional information for said identified product.

7. The method of claim 6, wherein said additional information is selected from the group consisting of: current pricing, inventory counts, next shipment date, and product specifications.

8. A method for providing product location information to a user while the user is shopping using the user's mobile phone comprising:
    providing a computer server interfacing with a network and comprising a central processor and a system memory having retailer inventory data for a plurality of products, said retailer inventory data formatted as a programmatically searchable plain text taxonomy including synonyms, slang, and phonetic data for each product;
    providing a personal mobile phone connected to said network;
    receiving at said computer server via said network an audio search request from said personal mobile phone, said audio search request comprising an indication of a desired product, said desired product being a product in said plurality of products;
    using an automatic speech recognition system, converting said audio search request to plain text;
    said server receiving said product identifier converted to plain text;
    using software stored in said system memory and executed by said central processor, said server finding a location in a store of a desired product of said plurality of products identified by said product identifier at least in part by searching said programmatically searchable taxonomy for said desired product matching said product identifier converted to text;
    using an automatic speech response system, converting said found location of said identified product to a spoken response;
    speaking said converted spoken response to said user through said personal mobile phone.

9. The method of claim 8, wherein said network is a data communication network.

10. The method of claim 9, wherein said data communication network is the Internet.

11. The method of claim 8, wherein said product identifier is a product brand name.

12. The method of claim 8, wherein said product identifier is a product description.

13. The method of claim 8, wherein said spoken response further comprises additional information for said identified product.

14. The method of claim 13, wherein said additional information is selected from the group consisting of: current pricing, inventory counts, next shipment date, and product specifications.

* * * * *